(12) United States Patent  
Feliciano

(10) Patent No.: US 7,329,035 B2  
(45) Date of Patent: Feb. 12, 2008

(54) CHILD'S NIGHTLIGHT

(76) Inventor: Marcos T. Feliciano, 3504 Rochambeau Ave. # 3H, Bronx, NY (US) 10467

( * ) Notice: Subject to any disclaimer, the term of this patent is extended or adjusted under 35 U.S.C. 154(b) by 102 days.

(21) Appl. No.: 11/082,126

(22) Filed: Mar. 16, 2005

(65) Prior Publication Data

US 2006/0209535 A1   Sep. 21, 2006

(51) Int. Cl.
*H01R 33/00* (2006.01)
(52) U.S. Cl. ........................ 362/644; 361/35; 361/806; 40/442; 446/485; 353/97; 353/120
(58) Field of Classification Search ................ 362/184, 362/234, 806, 811, 35, 644; 40/442; 446/485; 353/43, 97, 119, 120
See application file for complete search history.

(56) References Cited

U.S. PATENT DOCUMENTS

| | | | |
|---|---|---|---|
| 2,024,281 A | 12/1935 | Gaskin | |
| 3,026,640 A | 3/1962 | Ogdon | |
| 3,401,596 A | 9/1968 | Hirsch | |
| 3,756,710 A | 9/1973 | Taylor | |
| 4,285,028 A * | 8/1981 | Sundin et al. | ................ 362/35 |
| 4,823,240 A | 4/1989 | Shenker | |
| 5,321,449 A | 6/1994 | Coccoli et al. | |
| 5,367,349 A | 11/1994 | Zeiler | |
| 5,517,264 A * | 5/1996 | Sutton | ........................ 353/119 |
| 5,667,293 A | 9/1997 | Own | |
| 5,707,127 A | 1/1998 | Kain | |
| 5,934,223 A * | 8/1999 | Ellery-Guy | ................ 362/811 |
| 6,443,590 B1 | 9/2002 | Lovitt | |
| 6,550,930 B1 | 4/2003 | Portouche | |

* cited by examiner

*Primary Examiner*—Stephen F Husar
(74) *Attorney, Agent, or Firm*—Stephen E. Feldman P.C.

(57) ABSTRACT

There is disclosed a nightlight that can be held or worn by a child and that can display projected images in 3-D mode upon a flat surface to comfort and provide assurance for a child when left in the dark.

29 Claims, 4 Drawing Sheets

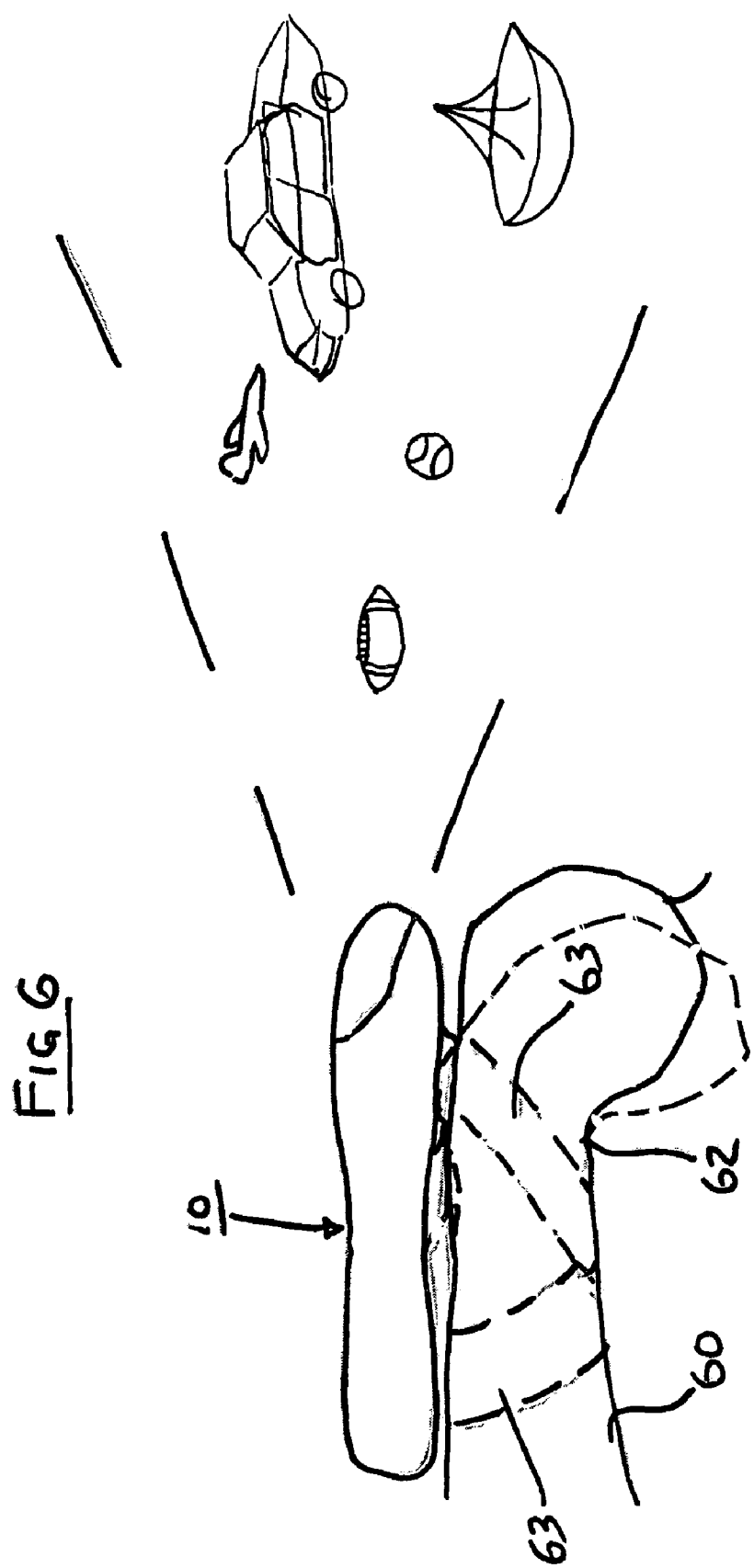

US 7,329,035 B2

CHILD'S NIGHTLIGHT

FIELD OF THE INVENTION

This invention is directed to a child's nightlight. More particularly, the nightlight of this invention can be readily held or worn by a child and is simple and easy for a child to use. Even more particularly, the nightlight of this invention is provided with a projection assemblage and associated light means that are capable of projecting illuminated images on a surface in a three dimensional (3-D) geometric configuration. The nightlight is also provided with means to rotate the projected images.

BACKGROUND OF THE INVENTION

Many articles and devices have been designed and manufactured for use by children. In general, these articles and devices are intended to not only amuse a child, but to also provide a means of comfort for a child. Illustrative of such articles and devices are those discussed hereinbelow.

For example, U.S. Pat. No. 2,024,261 to Gaskin discloses a flashlight equipped with a holder so that it can be secured on an arm.

U.S. Pat. No. 3,026,640 to Ogdon discloses a toy gun having a viewing scope similar to a sighting scope used on a real weapon.

U.S. Pat. No. 3,401,596 to Hirach discloses a projection apparatus having a flashlight that is equipped with a lens having a decalmania affixed thereto.

U.S. Pat. No. 3,576,710 to Taylor discloses a toy pistol projector having a fixed local length system and means to advance film by the pistol.

U.S. Pat. No. 4,823,240 to Shenker discloses an audiovisual assembly for garments.

U.S. Pat. No. 5,321,449 to Coccoli, et, al, discloses a projecting flashlight capable of receiving an insatiable slide in a transverse slot positioned in an enlarged head enabling an illuminated image from the slide to be projected onto a viewing surface.

U.S. Pat. No. 5,367,349 to Zeiler discloses an amusement projector having a dynamic silhouette producing mask mounted on a motion rod.

U.S. Pat. No. 5,667,293 to Own discloses flashlight having an illumination and alerting effect system.

U.S. Pat. No. 4,707,127 to Kain discloses a three dimensional image viewing apparatus that includes a filmstrip having a plurality of images.

U.S. Pat. No. 6,443,590 B1 to Lovitt discloses an article such as wearing apparel having a lateral animation display.

U.S. Pat. No. 6,550,930 B1 to Portcouche discloses a wrist mounted illumination device.

While the foregoing articles and devices are of interest and are useful, none disclose or suggest a child's nightlight that is capable of projecting 3-D illuminated images and rotating those images on a viewing surface.

SUMMARY OF THE INVENTION

Children between the ages of from about 3 to about 8 are often afraid of the dark. Often, these children have difficulty falling asleep and need to be comforted and reassured as they wait to fall asleep. The child's nightlight of this invention not only provides such children with a form of amusement, but it also comforts them and imparts a form of reassurance and security until sleep over takes them. In addition, the nightlight of the invention is simple, easy and safe to use by such children.

In general, the child's nightlight of the invention comprises: an elongated casing or housing having a closed rear end and an open front end; a power source within said casing or housing adjacent its rear end; a projection assemblage within said casing or housing adjacent its open front end; a plurality of images contained on said projection assemblage; means to activate and deactivate said power source; and, means to illuminate said images.

In one embodiment, the power source comprises an electrical battery pack and a motor.

In another embodiment, the projection assemblage includes a transparent, hollow image bearing member having a light bulb carrying member nested within said image bearing member.

In still a further embodiment the activation and deactivation means is in the form of an electrical switch.

In a further embodiment of the invention the illuminating means includes a plurality of light bulbs inserted receptacles provided on the light bulb carrying member and a light source capable of providing a prism effect.

The nightlight of the invention also includes means to rotate the projected images and a strap means so that the nightlight can be worn on the lower arm of a child.

These and further embodiments of the invention are set forth in more detail hereinbelow.

BRIEF DESCRIPTION OF THE DRAWING

The child's nightlight of the invention is further demonstrated by the following drawing wherein.

DETAILED DESCRIPTION OF THE DRAWING AND THE INVENTION

Figure 1:
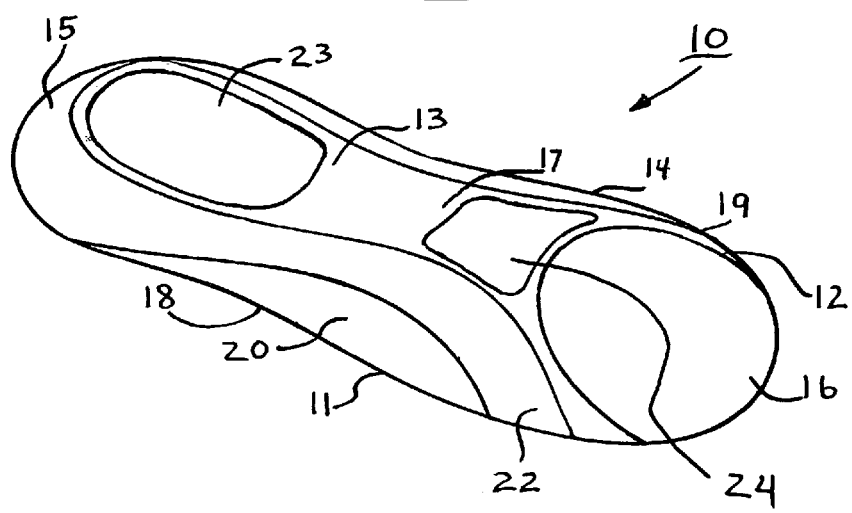
FIG. 1 is a perspective view of one geometric configuration of the child's nightlight of the invention.

The child's nightlight of the invention will be better understood from the ensuing description when taken together with the accompanying drawing wherein like reference numerals denote like parts.

Figure 4:
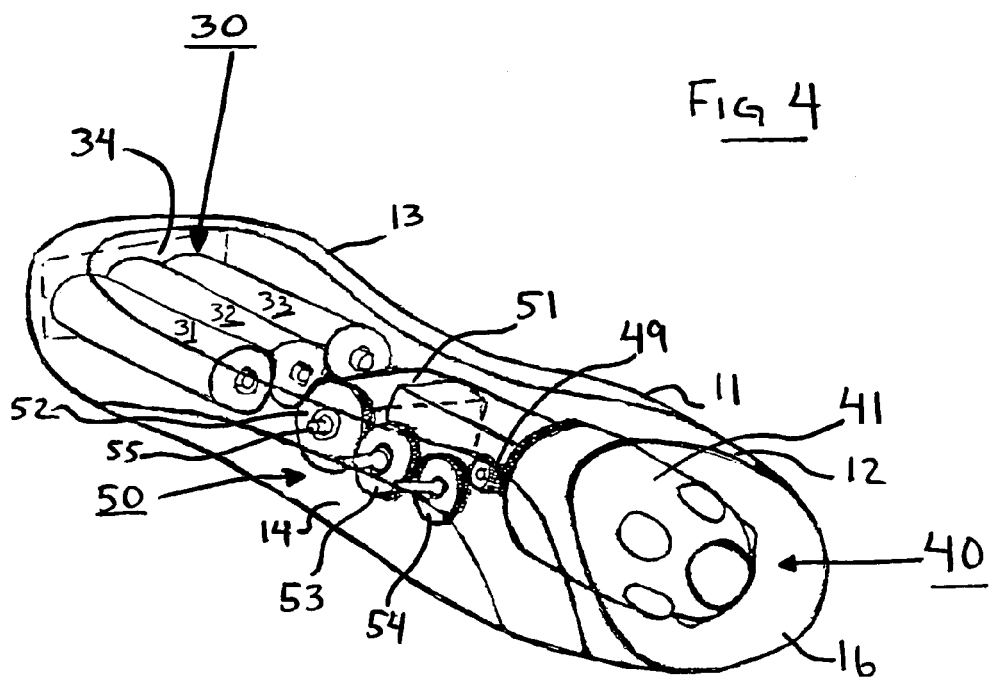
FIG. 4 is a perspective view of the child's nightlight illustrated in FIG. 1 with parts broken away to reveal the components contained within the nightlight.

The child's nightlight of the invention, generally identified by reference numeral 10 in FIG. 1, is in the form of an elongate casing or housing 11. Although the casing or housing 11 of the child's nightlight 10 can be provided in any geometric configuration or form such as cylindrical, oblong, rectangular and the like. Preferably, the casing or housing of the nightlight of the invention is provided in the geometric configuration shown in FIG. 1 which is in the form of an erogeric configuration having an open front oblate section 12 and a closed rear oblate section 13. The front and rear oblate sections 12 and 13 are connected by a pinched or tapered mid section 14. The rear oblate section 13 has a closed end 15 while the front oblate section has an open end 16. The casing or housing 11 formed by the oblate sections 12 and 13 and mid-section 14 has a top 17, a bottom 18 and opposed sides 19 and 20. As used throughout the application and in the appended claims, the term "erogeric configuration" is intended to mean and should be understood as meaning the description thereof set forth hereinabove and as illustrated in FIGS. 1, 4 and 6.

The opposed sides 19 and 20 of the casing or housing 11 can be provided with a commercially available glow-in-the-dark soft plastic material 22 to absorb any shock should the child's nightlight should be dropped or fall onto a hard surface.

Removable covers 23 and 24 can be provided on either the top 17 or the bottom 18 of the casing or housing 11 (here shown on the top 17 of the casing or housing 11). The removable covers 23 and 24 provide access to the power source compartment and projection assemblage within the casing or housing 11 and function similar to slide/snap fit covers used to access battery compartments of commercially available portable telephones and cameras.

Figure 2:
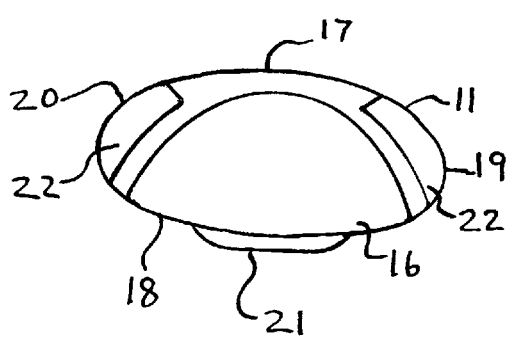
FIG. 2 is an elevation view of the open, projecting end of the nightlight shown in FIG. 1 when the power source is deactivated.
Figure 3:
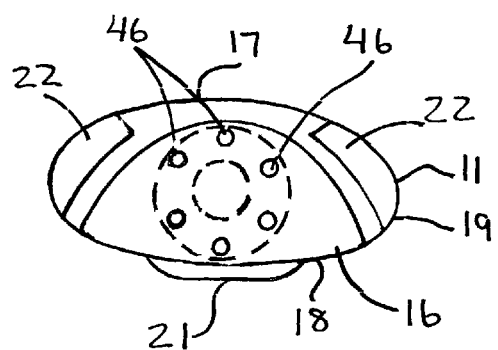
FIG. 3 is an elevation view the same as FIG. 2 showing the lit light bulbs when the power source is activated.

In FIGS. 2 and 3 there is illustrated the open 16 end of the casing or housing 11 when the illumination means are unlit (FIG. 2) and when the illumination means are lit (FIG. 3) showing the lit light bulbs 46 as described in more detail hereinbelow.

FIGS. 2 and 3 also identify a conventional, commercially available on-off button switch 21 seared on the bottom 18 of the casing 11. Button switch 21 serves to activate and deactivate (turn on and off) the primary electric powe source; i.e., the batteries (FIG. 4), that supply electric power to the nightlight.

Button switch 21 can be located anywhere along the logitudinal axis of bottom 18, but is preferably positioned at an area where the nightlight would be in contact with the wrist area of a child when the nightlight is worn on the wrist of a child as described more fully hereinbelow. In this position, a child can turn the button switch on and off by merely exerting downward pressure with its forearm onto a suitable surface.

FIG. 4 illustrates the internal components of the child's nightlight of the invention comprising a power package to provide an electrical power source, generally indicated by reference numeral 30, a projection assemblage, generally indicated by reference numeral 40 and a means to rotate the projection package 30 is used to provide an electrical power source that can be provided from any commercially available selection of dry cell batteries such as AAA batteries 31, 32 and 33 that are positioned to contact conventional conducting plates or strips 34. Using conventional means such as coil springs, the positive (anode) ends of the batteries 31, 32 and 33 can be urged to contact the conducting plates or strips 34.

Figure 4A:
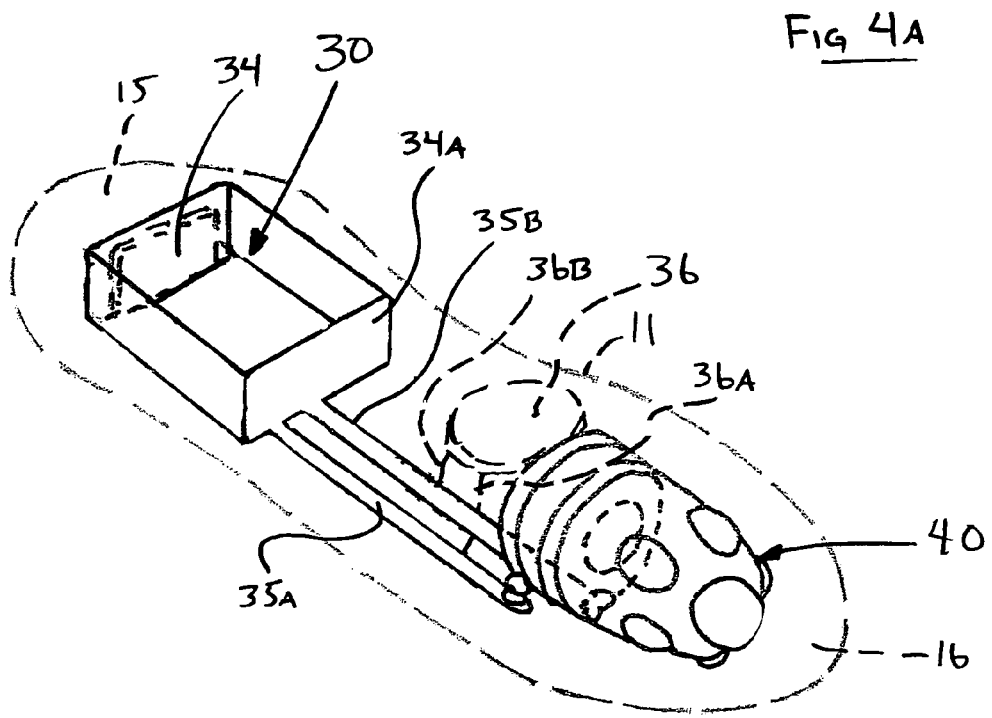
FIG. 4A is a perspective view similar to that shown in FIG. 4, part in phantom for clarity, illustrating one means by which electrical power can be transmitted to various components within the child's nightlight.

FIG. 4A illustrates one means for providing electrical power to various components within the nightlight of the invention. For clarity, the casing 11, closed end 15 and open end 16 of the nightlight are shown in phantom. For purposes of orientation, the power package; i.e., batteries, is indicated at 30 and the projection assemblage is indicated at 40.

The inner end of the power package 30 is provided with an additional conducting plate 34A. The rearward ends of electrical circuit power leads 35A and 35B are electrically secured to conducting plate 34A to receive power from the batteries in the power package 30. Lead 35A conducts the positive current and lead 35B conducts the negative current. These leads 35A and 35B are disposed to extend longitudinally from the connecting plate 34A forward to and through the projection assemblage 40 to complete circuit within the nightlight casing 11. This electrical circuit supplies electrical power to various components of the nightlight such as the motor 51 (FIG. 4) the various lights (FIG. 5) and gear assemblage (FIG. 5A).

As a safety feature to protect a child using the nightlight and to extend the useful life of the batteries supplying the electrical power, an automatic "on-off" timing device, shown in phantom at 36, is preferably included in the nightlight. The timing device 36 can be electrically connected to the electrical circuit by means of electrical leads 36A, 36B electrically secured to conductors 35A and 35B.

Commercially available automatic on-off timing devices of the type that are typically used in many children's toys are suitable for use in the nightlight of the invention. These commercial timing devices have various, pre-set time durations that act to cut off the electrical power at the end of the time period. One can select a timing device having the time duration desired.

For use in the nightlight of the invention, those timing devices having pre-set times of from about 5 minutes to about 20 minutes would be adequate.

Should the timing device activate itself and turn off the electrical power in the nightlight, the nightlight can be restarted by a child by simply engaging the on-off button 21 (FIG. 1) whereupon the timing device will automatically restart its timing period.

Figure 5:
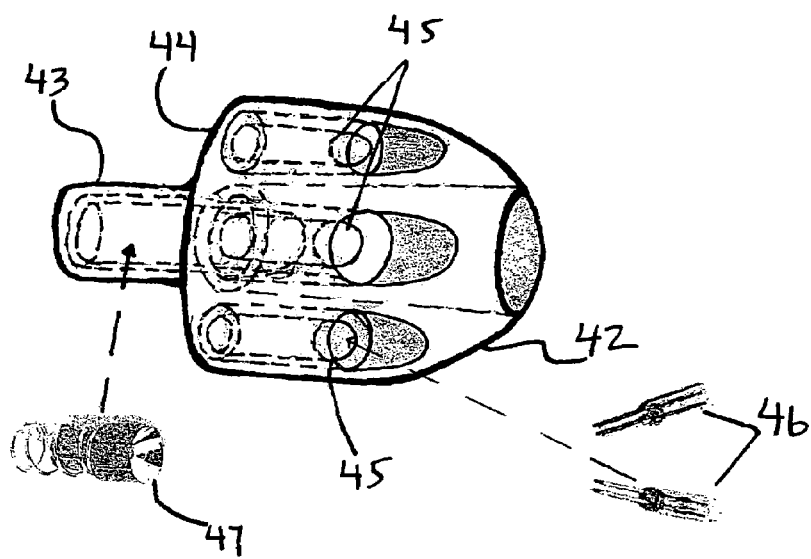
FIG. 5 is a partially exploded elevation view of the light bulb carrying member of the nightlight.
Figure 5A:
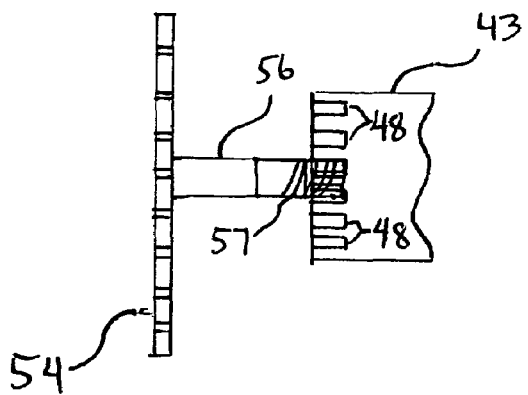
FIG. 5A is a side elevation view illustrating one means for rotating the projection assemblage of the nightlight; and, FIG. 6 is a schematic elevation view illustrating the nightlight in use and worn on the arm of a child.

FIGS. 4 and 5 illustrate details of the projection assemblage 40 of the night light of the invention. This assemblage includes a transparent, hollow cover 41, shown here in the geometric form of a bullet, a light bulb housing 42 nested within the transparent cover 41 and a hollow, cylindrical stem 43 extending rearwardly from the center of the light bulb housing. Transparent cover is removably secured to the inner end of the light bulb housing by conventional means such as a snap-fit engagement, mating screw threads, and the like.

In the embodiment illustrated in FIG. 5A, the rotation means 50 used to provide rotation to the projection assemblage 40 comprises a motor 51 and a plurality of intermeshing sprockets such as rear sprocket 52, intermediate sprocket 53 and front sprocket 54. A spindle 55 extending outwardly from the motor 51 and secured to the center hub of rear sprocket 52 causes the rear sprocket 52 to rotate which, in turn, causes the intermediate sprocket 53 and front sprocket 54 to rotate As more clearly shown in FIG. 5A, the front sprocket 54 has an inwardly extending spindle 56 with a worm gear 57 at its inner end that is positioned to engage cogs 48 provided on the outer surface of the inner end of the hollow cylindrical stem or shaft 43. Thus, when power is supplied from the power source 30, the motor 51 serves to rotate the sprockets 52, 53 and 54 as well as the spindle 56 bearing worm gear 57 to rotate the projection assemblage 40 at the open end 16 of the nightlight 10.

Transparent, hollow cover 41 has a plurality of image decals adhered in a randomly spaced manner about its outer surface such as a star, a crescent moon and a come all as illustrated in FIG. 6.

As can be seen in FIG. 5, light bulb housing 42 is in the form of a cylinder or drum and has a plurality of spaced apart light bulb receptacles 45 formed in its outer surface to receive miniature light bulbs 46 therein. The miniature light bulbs that can be used are commercially available and are similar to the types used to light up Christmas trees or in cell phones, and the like but having a higher wattage output of from about 6 to about 10. These miniature light bulbs provide a secondary source of illumination for the nightlight of the invention The primary source of illumination for the nightlight of the invention is provided by a MAG light 47 (FIG. 5). MAG light 47, after being connected to a conventional receptacle 49, is positioned to nest within the hollow stem or shaft 43 as indicated in FIG. 5. MAG light 47 is a commercially available light of the type that has a narrow light band capable of creating a prism effect enabling the images contained on the outer surface of the transparent, hollow cover 41 to be displayed in a 3-dimensional configuration.

The MAG light bulb and the miniature light bulbs can be all white, all of the same monochromatic color such as red, orange, yellow, green, blue, indigo and the like.

The motor 51 that can be used is one that is commercially available and is of the type typically employed in remote control devices to steer and manipulate powered toy cars and airplanes.

FIG. 6 illustrates the nightlight 10 secured to the lower arm 60 of a child adjacent its wrist area 62 by means of an elastic band or Velcro straps 63. As illustrated, a variety of images can be projected by the projection means onto a ceiling or a wall area in various forms such as fish, balls, a car, a plane, a sail boat, and the like.

Except for the conducting metals, the motor and the power source, the materials used to fabricate the nightlight of the invention can be provided from any suitable source such as metal, wood, plastics, and the like as well as combinations thereof. Preferably, durable and lightweight plastic materials are preferred such as high density polyethylenes, polypropylenes, polysulfones, polystyrenes, and the like. The transparent, hollow image carrying member 41 should preferably be provided from non-shattering materials such as celluloid or Plexiglas.

Although the invention has been described in some detail and with particularity, it will be appreciated by those skilled in the art that various changes and modifications can be made therein without departing from the scope and spirit of the invention.

What is claimed:

1. A child's nightlight comprising:
   (a) an extended casing in the form of an erogeric geometric configuration having an oblate rear end, an oblate front end, a top, a bottom, opposed sides and a tapered or pinched mid-section joining said front and rear oblate ends;
   (b) an energy supply within said extended casing adjacent said rear oblate end
   (c) means to activate and deactivate said energy supply;
   (d) a projectile shaped housing having a projection grouping wherein said projectile shaped housing is located within said extended casing adjacent said oblate front end;
   (e) a varied set of images contained in said projection grouping on said projectile shaped housing and
   (f) a primary and secondary means for illuminating said images when activated by said energy supply, wherein said projection grouping comprises a transparent, hollow cover, a light bulb housing and a hollow, cylindrical stem extending rearwardly from the rear face of said light bulb housing.

2. The nightlight of claim 1 wherein said transparent cover has a plurality of randomly spaced decal images adhered to its outer surface, said decal images being sleeted from the group consisting of animals, toys, heavenly bodies, geometric shapes and mixtures and combination thereof.

3. The nightlight of claim 1 wherein said light bulb housing has a plurality of spaced apart light bulb receptacles formed about its outer surface capable of receiving miniature light bulbs therein as the secondary means of illumination.

4. The night light of claim 3 wherein the color of said miniature light bulbs is selected from the group consisting of white, red, orange, yellow, green, blue indigo and violet as well as mixtures and combinations thereof.

5. The nightlight of claim 1 wherein said rearwardly extending hollow stem receives a MAG light therein as a primary means of illumination, said MAG light being capable of providing a narrow light band to create a prism effect.

6. The nightlight of claim 1 that includes means to spin said projectile shaped housing projection grouping.

7. The nightlight of claim 1 wherein said rotating means include a motor, a plurality of intermeshing sprockets, and associated spindles.

8. The nightlight of claim 1 that includes a push button that while in an idle state, simultaneously synchronized to disable the energy supplied, operating in a manner essentially independent of external influence or control.

9. A child's nightlight comprising:
   (a) an elongated casing or housing having an erogeric geometric configuration with an oblate closed rear end, and oblate open front end, a top, a bottom, opposed sides and a pinched or tapered mid-section joining said oblate rear and front ends:
   (b) a plurality of dry cell batteries within said casing or housing adjacent its closed rear end;
   (c) means to activate and deactivate said batteries;
   (d) a projection assemblage with said casing or housing adjacent its open front end, said projection assemblage comprising:
      (I) a transparent, hollow cover;
      (II) a lightbulb housing nested within said transparent, hollow cover; and,
      (III) a hollow, cylindrical stem or shaft extending rearwardly from the rear surface of said light bulb housing;
   (e) a plurality of images contained on the outer surface of said transparent cover; and,
   (f) a primary and a secondary means to illuminate said images.

10. The nightlight of claim 9 wherein the images contained on said transparent cover are randomly spaced decal images selected from the group consisting of animals, toys, heavenly bodies, geometric shapes and mixtures and combinations thereof.

11. The nightlight of claim 9 wherein said primary illumination means is a MAG light capable of providing a narrow light beam to create a prism affect and display said images in a 3-D format, said MAG light being positioned within the hollow stem or shaft of said light bulb housing.

12. The nightlight of claim 11 wherein the color of said MAG light is white.

13. The nightlight of claim 9 wherein said secondary illumination means comprises a plurality of miniature light bulbs secured in a plurality of spaced apart light bulb receptacles formed about the outer surface of said light bulb receptacle housing.

14. The nightlight of claim 13 wherein the color of said miniature light bulbs is selected from the group consisting of white, red, orange, yellow, green, blue, indigo and violet as well as mixtures and combinations thereof.

15. The nightlight of claim 9 that includes means to rotate said projection assemblage.

16. The nightlight of claim 15 wherein said rotating means includes a motor, a plurality of intermeshing sprockets, and associated spindles.

17. The nightlight of claim 9 wherein the top of said casing or housing includes means to access said batteries and to access said projection assemblage.

18. The nightlight of claim 9 that includes an automatic on-off timing device.

19. A child's nightlight comprising:
  (a) an elongated casing or housing having an erogeric geometric configuration with an oblate closed rear end, an oblate open front end, a top, a bottom, opposed sides and a pinched or tapered mid-section joining said oblate rear and front ends;
  (b) a plurality of dry cell batteries within said casing or housing adjacent said closed rear end;
  (c) means to activate and deactivates said batteries;
  (d) a primary illumination means and a secondary illumination means;
  (e) a projection assemblage within said casing or housing adjacent said open front end, said projection assemblage comprising;
    (I) a transparent, hollow cover having a plurality of randomly spaced decal images secured to its outer surface
    (II) a light bulb housing nested within said transparent, hollow cover, said light bulb housing having a plurality of spaced apart light bulb receptacles formed about its outer surface to receive said secondary illumination means therein in the form of miniature light bulbs;
    (III) a hollow cylindrical stem or shaft extending inwardly from the rear wall of said light bulb housing with said primary illumination means in the form of a MAG light nested therein; and,
    (IV) means to removably secure said transparent cover to said light bulb assemblage; and,
  (f) means to rotate said projection assemblage.

20. The nightlight of claim 19 wherein said elongated casing has a glow-in-the-dark plastic strip extending from said open front end to said closed rear end.

21. The nightlight of claim 19 wherein the means to activate and deactivate said batteries is a push button switch.

22. The nightlight of claim 19 wherein said MAG light is white and is capable of providing a narrow light beam to create a prism affect and display said images in a 3-D format.

23. The nightlight of claim 19 wherein the color of said miniature light bulbs is selected from the group consisting of white, red, orange, yellow, green, blue and indigo as well as mixtures and combinations thereof.

24. The nightlight of claim 19 wherein said rotating means includes a motor, a plurality of intermeshing sprockets, and associated spindles.

25. The nightlight of claim 19 wherein the top of said casing or housing includes means to access said batteries and to access said projection assemblage.

26. The nightlight of claim 19 that includes strap means secured to said casing or housing enabling a child to wear said nightlight on the lower arm of said child.

27. The nightlight of claim 19 that includes an automatic on-off timing device.

28. A child's nightlight comprising:
  (a) an extended casing in the form of an erogeric geometric configuration having an oblate rear end, an oblate front end, a top, a bottom, opposed sides and a tapered or pinched mid-section joining said front and rear oblate ends;
  (b) an energy supply within said extended casing adjacent said rear oblate end;
  (c) means to activate and deactivate said energy supply;
  (d) a projectile shaped housing having a projection grouping wherein said projectile shaped housing is located within said extended casing adjacent said oblate front end;
  (e) a varied set of images contained in said projection grouping on said projectile shaped housing,
  (f) a primary and secondary means for illuminating said images when activated by said energy supply.

29. The nightlight of claim 28 wherein said energy supply is provided by a group of dry cell batteries.

* * * * *